United States Patent [19]
Kofune et al.

[11] Patent Number: 5,952,795
[45] Date of Patent: Sep. 14, 1999

[54] STABILIZED HIGH VOLTAGE GENERATION CIRCUIT FOR CATHODE RAY TUBE DISPLAY APPARATUS

[75] Inventors: Hideki Kofune, Suwon; Joong-Yeol Kwon, Kyounggi-do, both of Rep. of Korea

[73] Assignee: SamSung Electronics Co., Ltd., Suwon, Rep. of Korea

[21] Appl. No.: 08/958,708

[22] Filed: Nov. 17, 1997

[30] Foreign Application Priority Data

Nov. 15, 1996 [KR] Rep. of Korea ..................... 96-54470

[51] Int. Cl.$^6$ .............................. H04N 3/185; G09G 1/04
[52] U.S. Cl. ........................................... 315/411; 315/386
[58] Field of Search ................................. 315/411, 408, 315/386; 363/21

[56] References Cited

U.S. PATENT DOCUMENTS

| | | | |
|---|---|---|---|
| 5,016,156 | 5/1991 | Ogawa | 363/21 |
| 5,317,495 | 5/1994 | Furukawa | 363/21 |
| 5,625,261 | 4/1997 | Ogawa | 315/411 |
| 5,627,437 | 5/1997 | Kim | 315/399 |
| 5,699,236 | 12/1997 | Choi | 363/15 |
| 5,796,218 | 8/1998 | Kwon et al. | 315/411 |

*Primary Examiner*—Edward P. Westin
*Assistant Examiner*—Shane R. Gardner
*Attorney, Agent, or Firm*—Robert E. Bushnell, Esq.

[57] ABSTRACT

A high voltage generation circuit incorporates the horizontal circuit of a cathode ray tube (CRT) monitor. The horizontal circuit comprises a horizontal output transistor, a retrace capacitor coupled in parallel with the horizontal output transistor, a damping diode which clamps the minimum voltage at the drain of the transistor to approximately ground potential, and a flyback transformer. The primary winding of the flyback transformer is coupled between a terminal where a DC power supply B+ is applied and the drain of the horizontal output transistor. A second transformer is provided between the retrace capacitor and the ground for producing a voltage at the secondary winding thereof each time a free oscillation occurs between the damping interval Td of the damper diode and the conduction interval Ton of the horizontal output transistor. A diode is also provided for rectifying the voltage produced at the secondary winding of the second transformer, and thus the energy stored in the retrace capacitor is returned to the power supply B+ as a return current. Further included is an error detector for comparing a DC voltage detected at the secondary winding of the first transformer with a reference voltage to produce an error detect signal; and a pulse width modulator for supplying a pulse-width modulated signal to the base of the horizontal output transistor, causing it to perform a switching operation in response to the error detect signal fed from the error detector. Preferably, the second transformer has a predetermined turns ratio between the primary and secondary windings thereof such that the voltage at the secondary winding may be such as to allow the diode Drg to be in the cut-off region at the discharge of the retrace capacitor if the retrace capacitor Cr is charged to a value more than one-half of the supply voltage.

23 Claims, 7 Drawing Sheets

STABILIZED HIGH VOLTAGE GENERATION CIRCUIT FOR CATHODE RAY TUBE DISPLAY APPARATUS

This application makes reference to, incorporates the same herein, and claims all benefits accruing under 35 U.S.C. §119 from an application for STABILIZED HIGH VOLTAGE GENERATION CIRCUIT FOR CATHODE RAY TUBE DISPLAY APPARATUS earlier filed in the Korean Industrial Property Office on the 15$^{th}$ day of the month of November 1996 and there duly assigned Serial No. 54,470/1996.

BACKGROUND OF THE INVENTION

1. Technical Field

The present invention relates to a high voltage power supply for a cathode ray tube display apparatus, and more particularly to a high voltage power supply for generating an anode electrode voltage for a cathode ray tube (CRT).

2. Related Art

In a cathode ray tube display apparatus, an acceleration voltage or anode voltage for a cathode ray tube is generated in the horizontal circuit using a flyback transformer. As described in more detail below, high voltage generation circuits are typically employed with the horizontal circuit of cathode ray tube display monitors. Such high voltage generation circuits are typically burdened by various disadvantages.

For example, as also described below, an undesirable increase in the temperature of components of the high voltage generation circuit often results from its operation. In addition, such high voltage generation circuits are typically provided with separate voltage controllers, and this increases the size of the horizontal circuit, as well as its manufacturing cost. Furthermore, when such high voltage generation circuitry is employed in a wide horizontal frequency range, the voltage controller is implemented by a series regulator, but this requires high power consumption.

I have noticed that contemporary designs in the art fail to provide a high voltage generation circuit that is not burdened by increase in temperature in components during operation, and which is also characterized by minimization of size and manufacturing cost, as well as minimization of power consumption.

SUMMARY OF THE INVENTION

It is, therefore, an object of the present invention to provide a stabilized process and circuit for generating high voltages.

It is another object to provide an improved process and circuit for providing high voltages to a cathode ray tube display.

It is still another object to provide a stabilized high voltage generation process and circuit for a cathode ray tube display monitor which can eliminate the voltage controller of the power supply at the primary winding of the flyback transformer.

These and other objects may be achieved, in accordance with the present invention, by a high voltage generation circuit which incorporates the horizontal circuit of the cathode ray tube monitor. The high voltage generation circuit comprises: a horizontal output transistor producing a high voltage flyback or retrace pulse voltage, during the retrace interval, at the drain thereof and on a retrace capacitor coupled in parallel with the horizontal output transistor; a damping diode which clamps the minimum voltage at the drain of the transistor to approximately ground potential; a first transformer having primary and second windings wherein the primary winding is coupled between a terminal where a DC power supply B+ is applied and the drain of the horizontal output transistor; a second transformer coupled between the retrace capacitor and ground for producing a voltage at the secondary winding thereof each time a free oscillation occurs between the damping interval Td of the damper diode and the conduction interval Ton of the horizontal output transistor; a diode for rectifying the voltage produced at the secondary winding of the second transformer, thereby returning the energy stored in the retrace capacitor to the power supply B+ as a return current; an error detector for comparing a DC voltage detected at the secondary winding of the first transformer with a reference voltage to produce an error detect signal; and a pulse width modulator for supplying a pulse-width modulated signal to the base of the horizontal output transistor to perform a switching operation in the horizontal output transistor in response to the error detection signal provided by the error detector.

In the preferred embodiment of the invention, the first transformer is a flyback transformer, wherein, by a suitable turns ratio between the primary and secondary windings of the flyback transformer, a high voltage is generated in the secondary winding of the transformer, and is rectified via a diode to produce an anode voltage HV of a cathode ray tube. The second transformer has a predetermined turns ratio between the primary and secondary windings thereof such that the voltage at the secondary winding may be such as to allow the diode Drg to be in the cut-off region at the discharge of the retrace capacitor if the retrace capacitor Cr is charged to a value more than one-half of the supply voltage. The turns ratio between the primary and secondary windings is set to satisfy the following expression:

$$\left(\frac{Nrgs}{Nrgp}\right) > 2$$

wherein Nrgp and Nrgs represent primary and secondary windings, respectively, of the second transformer.

According to the present invention, prevention of an increase in the temperature in the horizontal output transistor as well as an increase in the energy efficiency of the flyback transformer is possible due to the energy recovery function of the high voltage generation circuit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
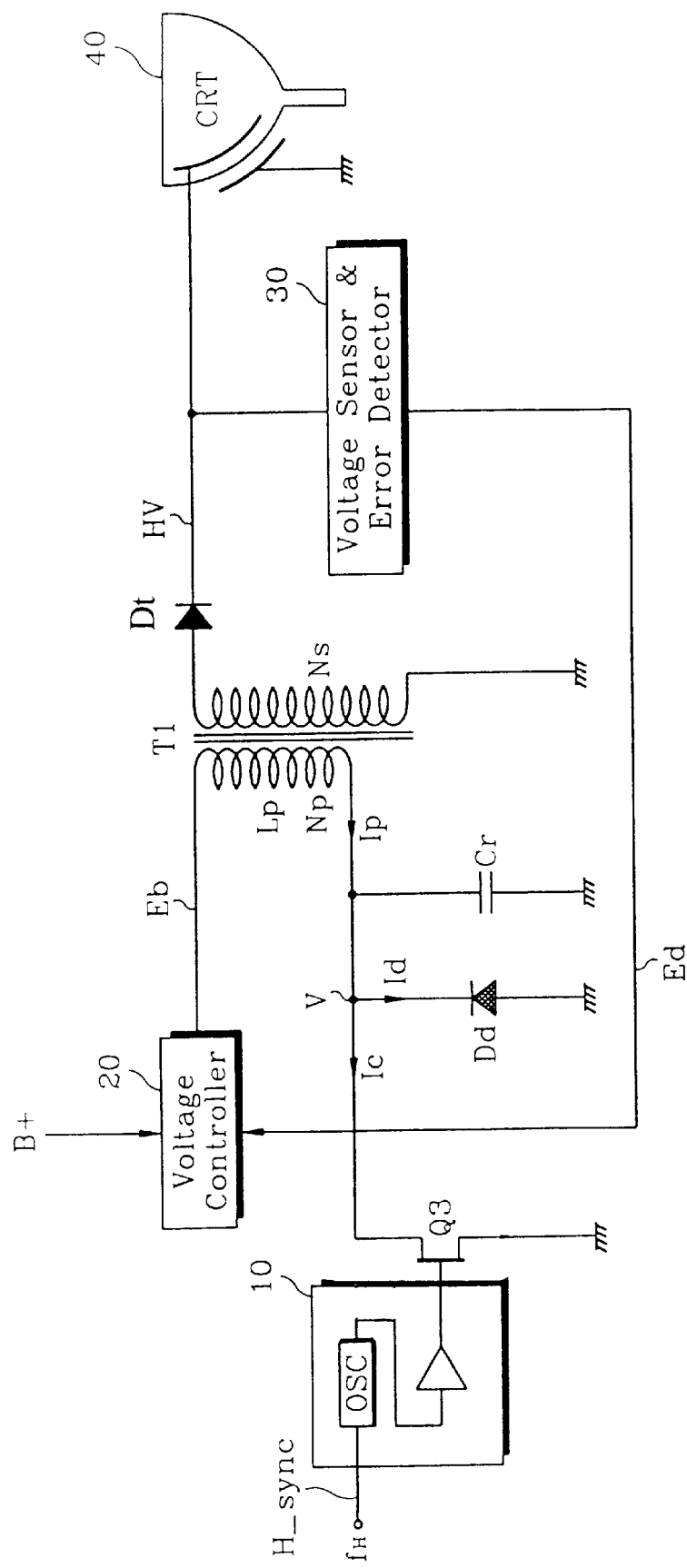
FIG. 1 is a schematic diagram depicting a high voltage generation circuit for use with a horizontal circuit of cathode ray tube display monitor.

FIG. 1 is a schematic diagram depicting a high voltage generation circuit for use with horizontal circuitry of a cathode ray tube display monitor. In FIG. 1, a primary winding of the flyback transformer T1 is coupled between a terminal where a DC power supply Eb is developed and the drain of a horizontal output transistor Q3. The horizontal output transistor Q3 is coupled between the flyback transformer T1 and ground, and conducts a current Ip from the power supply to energize the flyback transformer T1 and produce a sawtooth horizontal deflection current in the horizontal deflection winding (not shown) for repetitive horizontal scanning. The deflection circuit has not been illustrated in order to simplify the drawings. The base of the horizontal output transistor Q3 is coupled to a power switch 10 which may be constructed with a horizontal oscillator and a driver. The power switch 10 controls a switching operation in the output transistor Q3 in synchronization with the horizontal frequency H_Sync at a duty rate of more than 50%. A retrace capacitor Cr is coupled in parallel with horizontal output transistor Q3. A damper diode Dd clamps the minimum voltage at the drain of the transistor Q3 to approximately ground potential.

At the drain of the horizontal output transistor Q3 and on the retrace capacitor Cr, a high voltage flyback or retrace pulse voltage is produced during the retrace interval. As the electron beam scans horizontally during the trace interval, the horizontal output transistor Q3 is turned on, and it shuts off during the retrace interval. By a suitable turns ratio between the primary and secondary windings Np, Ns of the flyback transformer T1, a high voltage of, for example, 25~33 KV is generated in the secondary winding of the transformer T1 and is rectified via a diode Dt to produce an anode voltage HV for cathode ray tube 40. An increase in beam current loading produces a decrease in the high voltage HV at the secondary winding of the flyback transformer T1, and thus it is necessary to regulate or stabilize the high voltage at the secondary winding.

Figure 2A:
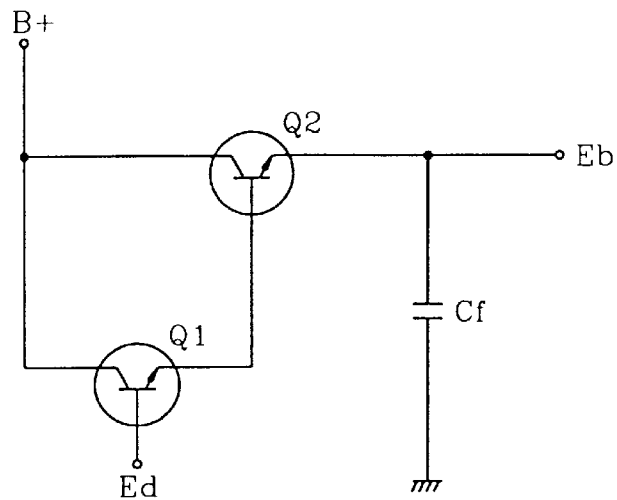
FIGS. 2A and 2B are circuit diagrams of a voltage controller of the high voltage generation circuit shown in FIG. 1.
Figure 2B:
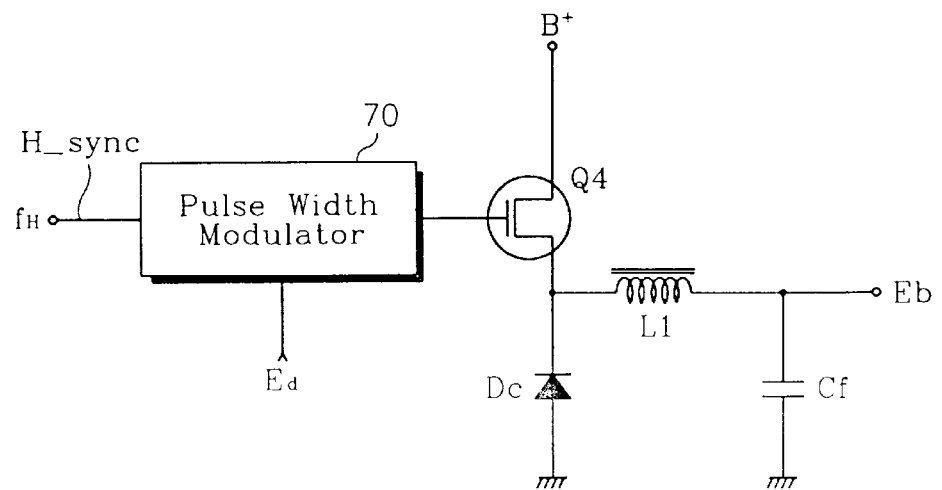

Stabilization of the high voltage HV at the secondary winding has been performed by a voltage controller 20. The voltage controller 20 controls current of a B+ power supply, and outputs controlled supply voltage Eb to the primary winding of the flyback transformer T1 in response to a detection signal fed from a voltage sensor and error detector 30 coupled to the secondary winding of the flyback transformer T1. The voltage controller 20 can be exemplified by a series regulator and a switching regulator shown in FIG. 2A and FIG. 2B, respectively. The series regulator of FIG. 2A is a conventional circuit known to those of ordinary skill in the art, and comprises transistors Q1 and Q2 and capacitor Cf connected as shown between the B+ power supply and the controlled supply voltage output Eb. The switching regulator of FIG. 2B is a conventional circuit known to those of ordinary skill in the art and comprises a pulse width modulator 70, transistor Q4, diode Dc, inductor L1 and capacitor Cf connected as shown between the horizontal frequency H_sync frequency $f_H$ and the controlled supply voltage output Eb.

The operation of the high voltage generation circuit will now be further described. The high voltage HV at the secondary winding is divided by a voltage divider (not shown) and compared with a reference voltage in the error detector 30 to produce an error detection signal Ed which is supplied as a control input to the voltage controller 20. As the level of the voltage HV at the secondary winding is decreased below a preset level, current Ic of the power supply Eb is increased, and thus produces a constant voltage level at the secondary winding of the flyback transformer T1.

With the above voltage controller 20, the high voltage HV produced at the secondary winding of the flyback transformer T1 can be expressed by the following equation:

$$HV = Eb\left(\frac{\pi}{2}\right)\left(\frac{Ts}{Tr}\right)\left(\frac{Ns}{Np}\right) \qquad (1)$$

Where, Eb is the controlled supply voltage, π equals 3.14, Ts represents the trace interval, Tr represents the retrace interval, Np represents turns of the primary winding, and Ns represents turns of the secondary winding.

Figure 3:
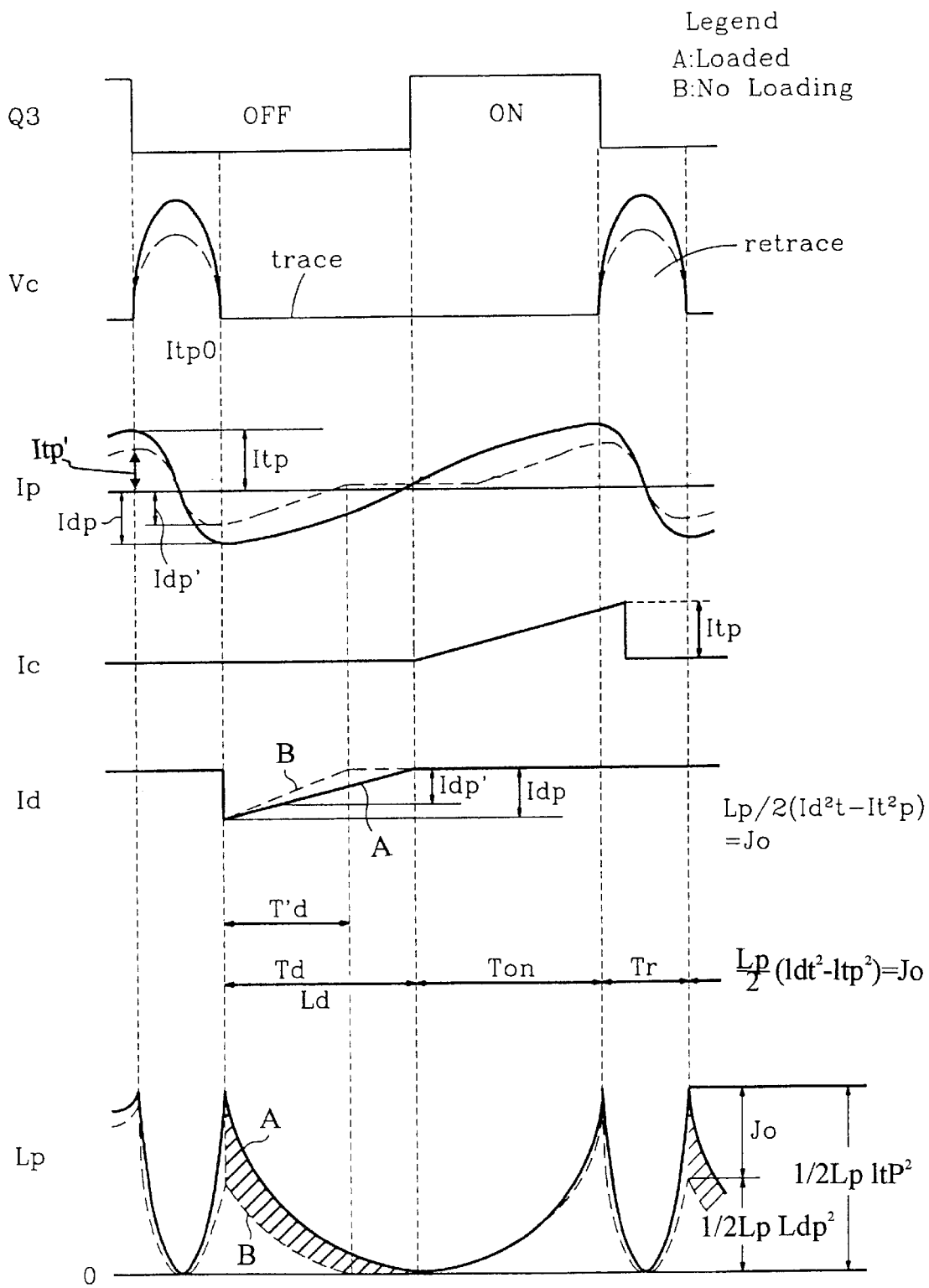
FIG. 3 is a waveform diagram illustrating the operation of each part of the high voltage generation circuit shown in FIG. 1.

Conventionally, the voltage controller 20 controls the supply voltage Eb in such a manner that the current Ic supplied to the horizontal output transistor Q3 is increased by an amount Itp during the conduction period of the transistor Q3 if it is set to be turned on at about one-half of the trace interval, as shown in FIG. 3. In FIG. 3, there are shown waveforms produced at each part of the circuit, especially between the primary winding of the flyback transformer T1 and the horizontal output transistor Q3, with respect to beam current changes where waveform A denoted as a thick line represents a beam current loading state, and waveform B denoted as a dotted line represents an unloading state. Further, Vc represents the flyback or retrace pulse produced at the drain of the horizontal output transistor Q3 and on the retrace capacitor Cr. Ip represents a sawtooth current produced in a horizontal deflection winding for repetitive horizontal scanning.

As shown in FIG. 3, the sawtooth circuit Ip produced in the horizontal deflection winding varies, in the beam current loading state, by a positive amount Itp and a negative amount Idp; in the unloading state, current Ip varies by a positive amount Itp' and a negative amount Idp. Id represents current in the damper diode Dd, and Lp represents the energy stored in the primary winding of the flyback transformer T1. As shown in damper diode current waveform Id, since the damper interval Td is decreased to T'd as the beam current is changed from the unloading state to the loading state and the load power is increased, the duty rate of the switching transistor Q3 should increase, and this allows the damper diode current Id to be introduced into the transistor Q3. This results in an increase in temperature of the horizontal output transistor Q3.

In addition, since the voltage controller 20 is separately configured in the high voltage generation circuit, the size of the total horizontal circuit is increased, and its manufacturing cost is increased. Further, when the circuit is used in wide horizontal frequency range, the voltage controller 20 implemented by a series regulator requires high power consumption.

Figure 4:
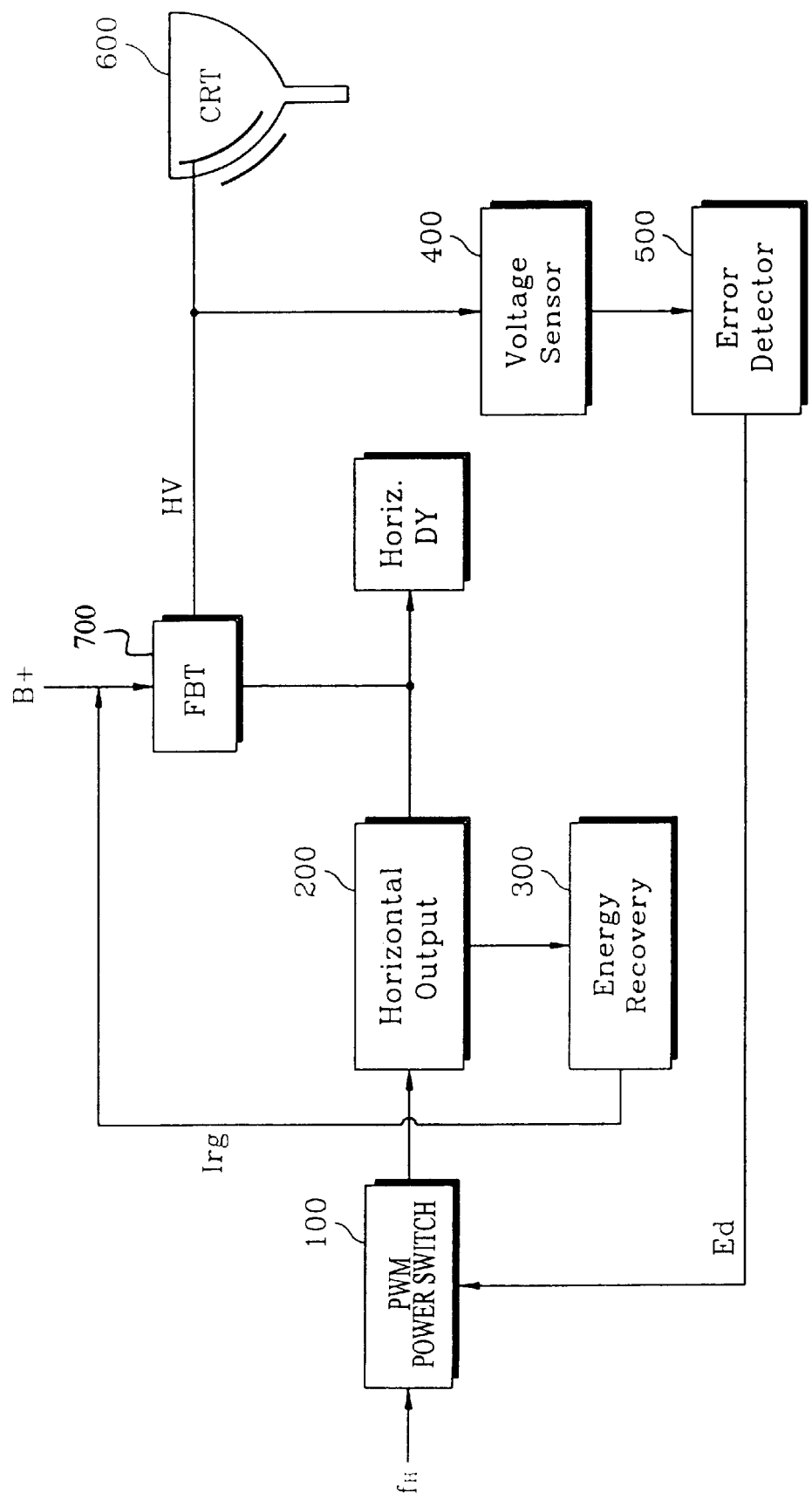
FIG. 4 is a block diagram of a high voltage generation circuit constructed in accordance with the principles of the present invention.

Referring to FIG. 4, there is shown a block diagram of a high voltage generation circuit in accordance with the present invention. The high voltage generation circuit is incorporated with the horizontal circuit and supplies a stabilized power supply with the flyback transformer which produces high voltage HV applied to the anode of cathode ray tube.

The high voltage generation circuit comprises a pulse width modulation (PWM) power switch 100, a horizontal output circuit 200, an energy recovery circuit 300, a voltage sensor 400, an error detector 500, and a flyback transformer 700.

Figure 5:
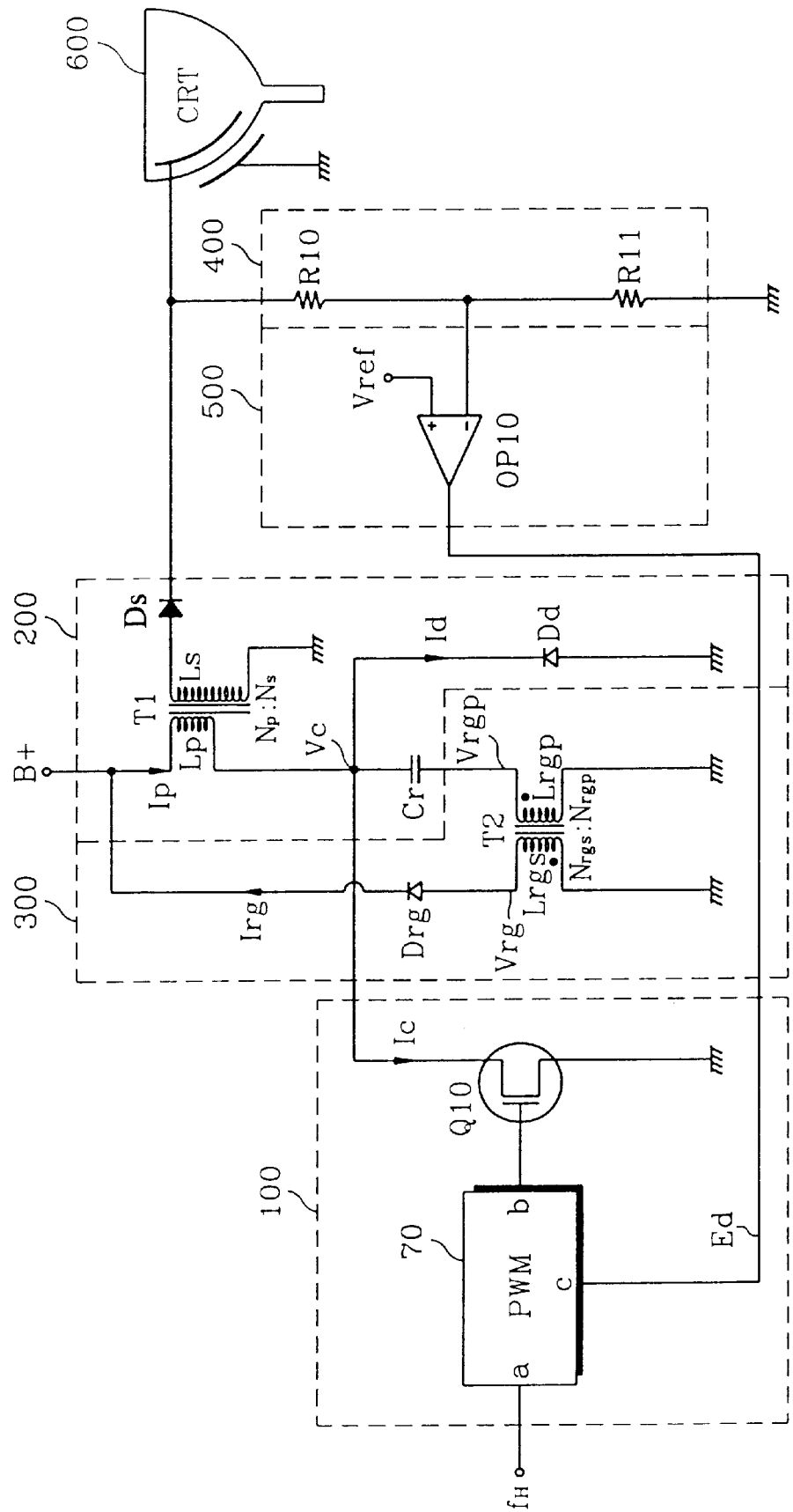
FIG. 5 is a schematic diagram of the high voltage generation circuit shown in FIG. 4.

The detailed circuit diagram is shown in FIG. 5, in which a primary winding of the flyback transformer T1 is coupled between a terminal where a DC power supply B+ is applied and a drain of a horizontal output transistor Q10. The horizontal output transistor Q10 is coupled between the flyback transformer T1 and ground, and conducts a current Ip from power supply B+ to energize the flyback transformer T1, and to produce a high voltage flyback or retrace pulse voltage during the retrace interval at the drain of the horizontal output transistor Q10 and on the retrace capacitor Cr. Also, a sawtooth horizontal deflection current is produced in the horizontal deflection winding coupled to the drain of the horizontal output transistor Q10 for repetitive horizontal scanning. The deflection circuit has not been illustrated in order to simplify the drawings. A retrace capacitor Cr is coupled in parallel with horizontal output transistor Q10. A damper diode Dd clamps the minimum voltage at the drain of the transistor Q10 to approximately ground potential.

The base of the horizontal output transistor Q10 is coupled to a power switch 100 which includes a pulse width modulator (PWM) 70. As the electron beam scans horizontally during the trace interval, the horizontal output transistor Q10 is turned on, and it shuts off during the retrace interval (see FIG. 6). The power switch 100 controls the switching operation of the output transistor Q10 such that the pulse-width modulated signal is supplied to the base of the horizontal output transistor Q10 in response to an error detect Ed signal fed from an error detector 500. With this, the turn-on interval of the horizontal output transistor Q10 is decreased as the beam current loading increases and as a DC voltage develops at the secondary winding of the flyback transformer T1.

By establishing a suitable turns ratio between the primary and secondary windings Np, Ns of the flyback transformer T1, a high voltage of, for example 25~33 KV is generated in the secondary winding Ls of the transformer T1 and is rectified via diode Ds to produce an anode voltage HV for cathode ray tube 600. The high voltage HV at the secondary winding is divided by resistors R10, R11 of the voltage sensor 400 and is compared with a reference voltage Vref in the error detector 500 to produce the error detect signal Ed supplied as a control input to the pulse width modulator 70. The error detector 500 may consist of an operational amplifier OP10 acting as a comparator.

An energy recovery transformer T2 is coupled between the retrace capacitor Cr and ground. The primary winding Lrgp of the energy recovery transformer T2 is in a series current path with the primary winding Lp of the flyback transformer T1 and the retrace capacitor Cr. The energy recovery transformer T2 has a predetermined turns ratio between the primary and secondary windings Nrgp, Nrgs and the output of the secondary winding Lrgs is coupled to the B+ power supply through a diode Drg.

In operation, the flyback or retrace pulse voltage Vc is produced at the drain of the horizontal output transistor Q10 and on the retrace capacitor Cr. Peak value Vcp of the flyback pulse voltage (shown in FIG. 6), based on the supply voltage Eb, can be obtained by the following equation:

$$Vcp = \left(\frac{\pi \times Eb}{2}\right)\left(\frac{Ton}{Tr}\right)\left[1 + \sqrt{\left(1 - \frac{2 \times Jo}{Jtp}\right)}\right] \quad (2)$$

where Eb is the supply voltage, $\pi$ equals 3.14, Ton represents a turn-on or conduction interval of the horizontal output transistor Q10, Tr represents the retrace interval, Jo represents the sum of an output energy and energy loss of the circuit (joule/cycle), and Jtp represents a stored energy of the primary winding of the flyback transformer T1 at the end of the Ton interval.

The high voltage HV produced at the secondary winding of the flyback transformer T1 assumes a value of Vc (Ns/Np). Also, in equation (2), it is understood that HV can be controlled by controlling the Ton interval. This method is possible only if the time Ton does not fall on damper interval Td of the damper diode Dd.

The energy supplied during the retrace interval Tr assumes a volume of Jdp (Jtp–Jo), and from this value the damper interval Td (see FIG. 6) can be calculated by the following:

$$Td = Ton\sqrt{\left(1 - \frac{Jo}{Jtp}\right)} \quad (3)$$

Equation (3) indicates that an increase in output energy Jo produces a decrease in the damper interval Td. It is desirable that the Ton interval is compensated to increase the Ton time.

Figure 6:
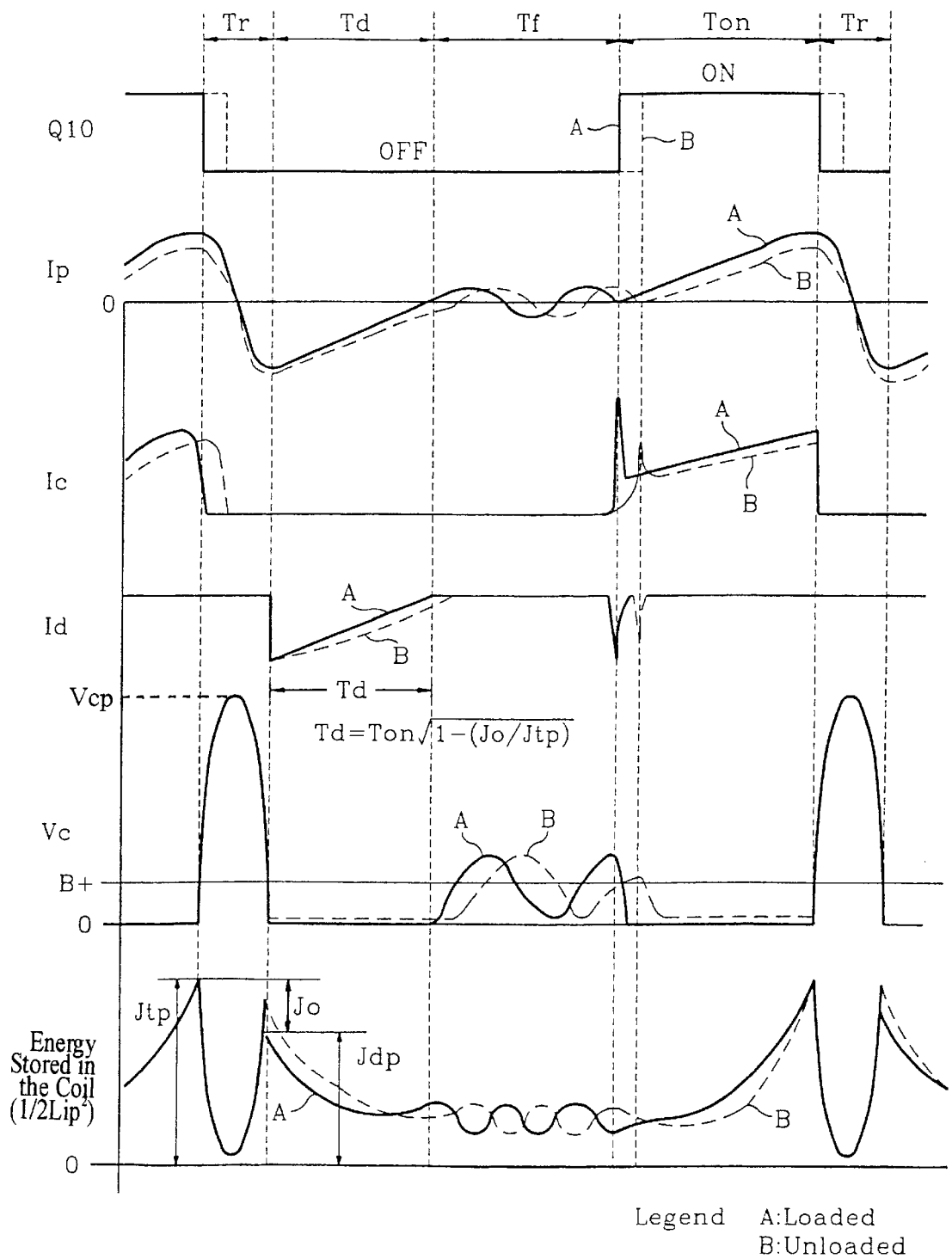
FIG. 6 is a waveform diagram illustrating the operation of each part of the high voltage generation circuit shown in FIG. 5.

If the damper interval Td is completed, and the Ton interval is not initiated, a free oscillation is produced during the time interval Tf between Td and Ton at the flyback or retrace pulse Vc, as shown in FIG. 6. This free oscillation occurs as energy is applied by charging the retrace capacitor Cr through the primary winding of the transformer T2. The free oscillation ends at the beginning of the conduction interval of the transistor Q10, and charge stored in the retrace capacitor Cr vanishes through the discharge path of the transistor Q10.

It is desirable that the energy stored in the retrace capacitor Cr be recovered to reduce energy loss of the high voltage Vc generation circuit. According to the invention, each time the free oscillation occurs, the voltage Vrg produced at the secondary winding of the energy recovery transformer T2 is rectified by the diode Drg, and thus the energy is returned to the power supply B+ as return current Irg.

However, in this case, since the voltage Vrg at the secondary winding of the energy recovery transformer T2 is also produced during the retrace interval, it should be considered that the turns ratio between the primary and secondary windings Nrgp, Nrgs be determined to prevent occurrence of the corresponding return current Irg.

For example, if the retrace capacitor Cr is charged to a value more than one-half the supply voltage Eb and the energy recovery is performed, the voltage Vrg should be set such that it allows the diode Drg to be in the cut-off region at the discharge of the retrace capacitor Cr by considering the following:

$$\omega rg = \frac{1}{\sqrt{Lrgp \times Cr}} \quad (4)$$

where $\omega rg$ is frequency and Lrgp is primary winding inductance, and that $$\left(\frac{Nrgs}{Nrgp}\right)\left(\frac{Eb}{2}\right)\cos(\omega rg \times t) > Eb \tag{5}$$

Therefore, it should satisfy the following:

$$\left(\frac{Nrgs}{Nrgp}\right) > 2 \tag{5'}$$

Further, in order to cut off the diode Drg during the retrace interval, the voltage Vrgp at the primary winding of the energy recovery transformer T2 should satisfy the following expression:

$$Vrgp = -\left(\frac{d}{dt}\right) Itp \cos(\omega rg \times t) \times Lsgp \tag{6}$$

where Itp, ωrg and Lsgp are the current, frequency and inductance, respectively, in the primary winding of transformer T2.

Thus, the voltage Vrgs at the secondary winding of the energy recovery transformer T2 should satisfy the following expression:

$$Vrgs = \left(\frac{Nrgs}{Nrgp}\right) Itp Lsgp\left(\frac{\pi}{Tr}\right) \sin(\omega rg \times t) < Eb \tag{7}$$

and therefore, $$Lsgp < \left(\frac{Nrgp}{Nrgs}\right) Ep \times \frac{Tr}{(\pi \times Itp)} \tag{8}$$

Figure 7:
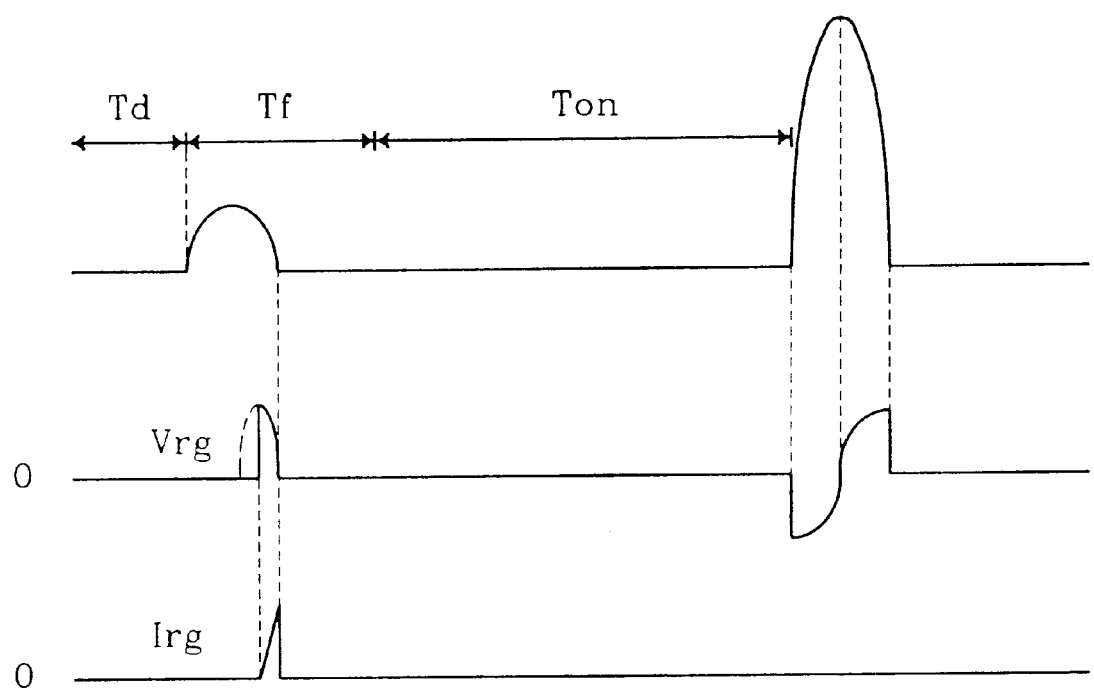
FIG. 7 is a waveform diagram illustrating an energy collection scheme as implemented in the high voltage generation circuit in accordance with the principles of the present invention.

Referring to FIG. 7, there is shown a waveform diagram illustrating the above energy collection scheme in the high voltage generation circuit.

By designing the energy recovery transformer T2 which satisfies the above expressions, the energy stored in the retrace capacitor Cr can be collected at the primary winding of the flyback transformer T1 which is supplied by the power supply. Thus, it is possible to control the current Ic flowing into the horizontal output transistor Q10 such that most of the current of the power supply is consumed in the transistor Q10. Also, according to the present invention, prevention of an increase in the temperature of the transistor Q10, as well as an increase in the energy efficiency of the flyback transformer, are possible due to the energy recovery function.

As apparent from the foregoing, the high voltage generation circuit of the present invention provides for an effective design of the horizontal circuit of a cathode ray tube monitor which can eliminate adoption of the voltage controller that controls power supply at the primary winding of the flyback transformer. The present invention also provides for a reduced scale of the high voltage generation circuit, as well as reliable circuit operation.

While the invention has been described in terms of an exemplary embodiment, it is contemplated that it may be practiced as outlined above with modifications within the spirit and scope of the appended claims.

What is claimed is:

1. A high voltage generation circuit incorporated into a horizontal circuit of a cathode ray tube monitor for supplying an anode electrode voltage to the cathode ray tube, comprising:

a horizontal output transistor having a base and a drain, and being connected in parallel with a retrace capacitor, said horizontal output transistor producing one of a high voltage flyback and a retrace pulse voltage during a retrace interval at the drain and on the retrace capacitor;

a damping diode connected to said horizontal output transistor for clamping a minimum voltage at the drain to approximately ground potential;

a first transformer having primary and second windings, wherein the primary winding is coupled between a DC power supply terminal and the drain of the horizontal output transistor;

a second transformer having a primary winding and a secondary winding, said primary winding being coupled between the retrace capacitor and ground for producing a voltage at the secondary winding of said second transformer each time a free oscillation occurs between a damping interval of the damping diode and a conduction interval of the horizontal output transistor;

a diode connected to the secondary winding of the second transformer for rectifying the voltage produced at the secondary winding of the second transformer, thereby returning energy stored in the retrace capacitor to the power supply as a return current;

an error detector connected to the secondary winding of the first transformer for comparing a DC voltage detected at the secondary winding of the first transformer with a reference voltage to produce an error detect signal; and a pulse width modulator connected to said error detector and responsive to the error detect signal for supplying a pulse-width modulated signal to the base of the horizontal output transistor, whereby a switching operation is performed by the horizontal output transistor.

2. The high voltage generation circuit as claimed in claim 1, wherein the first transformer is a flyback transformer, and wherein, by setting a given turns ratio between the primary and secondary windings of the first transformer, a high voltage is generated in the secondary winding of the first transformer, said circuit further comprising a diode connected to the secondary winding of the first transformer for producing an anode voltage for the cathode ray tube.

3. The high voltage generation circuit as claimed in claim 1, wherein the second transformer has a predetermined turns ratio between the primary and secondary windings thereof such that the voltage at the secondary winding is set to a given value that allows the diode to be in a cut-off region at discharge of the retrace capacitor if the retrace capacitor is charged to a value more than one-half of a supply voltage.

4. The high voltage generation circuit as claimed in claim 3, wherein the turns ratio between the primary and secondary windings of the second transformer satisfies the following expression:

$$\left(\frac{Nrgs}{Nrgp}\right) > 2$$

where Nrgp and Nrgs represent the number of turns in the primary winding and the secondary winding, respectively, of the second transformer.

5. The high voltage generation circuit as claimed in claim 1, wherein the voltage at the primary winding of the second transformer satisfies the following expression in order to cut off the diode during the retrace interval:

$$Vrgp = -\left(\frac{d}{dt}\right)Itp\cos(\omega rg \times t) \times Lsgp$$

where Vrgp is the voltage, Itp is the current, ωrg is the frequency, and Lsgp is the inductance in the primary winding of the second transformer.

6. The high voltage generation circuit as claimed in claim 1, wherein the voltage at the secondary winding of the second transformer satisfies the following expression:

$$Vrgs = \left(\frac{Nrgs}{Nrgp}\right)ItpLsgp\left(\frac{\pi}{Tr}\right)\sin(\omega rg \times t) < Eb$$

where Vrgs is the voltage in the secondary winding of the second transformer, Nrgs and Nrgp are the number of turns in the secondary and primary, respectively, of the second transformer; Itp, Lsgp and ωrg are the current, inductance and frequency, respectively, in the primary winding of the second transformer; and Tr and Eb are the retrace interval and a supply voltage, respectively.

7. A high voltage generation circuit incorporated into a horizontal circuit of a cathode ray tube monitor for supplying an anode electrode voltage to the cathode ray tube, comprising:

horizontal output transistor means having a base and a drain, and being connected in parallel with a retrace capacitor, for producing one of a high voltage flyback and a retrace pulse voltage during a retrace interval at the drain and on the retrace capacitor;

a first transformer having primary and secondary windings, wherein the primary winding is coupled between a power supply terminal and the drain of said horizontal output transistor means;

a second transformer having a primary winding and a secondary winding, said primary winding being coupled between the retrace capacitor and ground for producing a voltage at the secondary winding of said second transformer;

error detector means connected to the secondary winding of the first transformer for comparing a voltage detected at the secondary winding of the first transformer with a reference voltage to produce an error detect signal; and pulse width modulator means connected to said error detector means and responsive to the error detect signal for supplying a pulse-width modulated signal to the base of the horizontal output transistor means, whereby a switching operation is performed by said horizontal output transistor means.

8. The high voltage generation circuit as claimed in claim 7, further comprising damping diode means connected to said horizontal output transistor means for clamping a minimum voltage at the drain of said horizontal output transistor means to approximately ground potential.

9. The high voltage generation circuit as claimed in claim 8, wherein said second transformer produces said voltage at said secondary winding of said second transformer each time a free oscillation occurs between a damping interval of said damping diode means and a conduction interval of said horizontal output transistor means.

10. The high voltage generation circuit as claimed in claim 7, further comprising diode means connected to the secondary winding of the second transformer for rectifying the voltage produced at the secondary winding of the second transformer, thereby returning energy stored in the retrace capacitor to a power supply as a return current.

11. The high voltage generation circuit as claimed in claim 10, wherein the second transformer has a predetermined turns ratio between the primary and secondary windings thereof such that the voltage at the secondary winding is set to a given value that allows the diode means to be in a cut-off region at discharge of the retrace capacitor if the retrace capacitor is charged to a value more than one-half of a supply voltage.

12. The high voltage generation circuit as claimed in claim 11, wherein the turns ratio between the primary and secondary windings of the second transformer satisfies the following expression:

$$\left(\frac{Nrgs}{Nrgp}\right) > 2$$

where Nrgp and Nrgs represent the number of turns in the primary winding and the secondary winding, respectively, of the second transformer.

13. The high voltage generation circuit as claimed in claim 10, wherein the voltage at the primary winding of the second transformer satisfies the following expression in order to cut off the diode means during the retrace interval:

$$Vrgp = -\left(\frac{d}{dt}\right)Itp\cos(\omega rg \times t) \times Lsgp$$

where Vrgp is the voltage, Itp is the current, ωrg is the frequency, and Lsgp is the inductance in the primary winding of the second transformer.

14. The high voltage generation circuit as claimed in claim 7, wherein the first transformer is a flyback transformer, and wherein, by setting a given turns ratio between the primary and secondary windings of the first transformer, a high voltage is generated in the secondary winding of the first transformer, said circuit further comprising a diode connected to the secondary winding of the first transformer for producing an anode voltage for the cathode ray tube.

15. The high voltage generation circuit as claimed in claim 7, wherein the voltage at the secondary winding of the second transformer satisfies the following expression:

$$Vrgs = \left(\frac{Nrgs}{Nrgp}\right)ItpLsgp\left(\frac{\pi}{Tr}\right)\sin(\omega rg \times t) < Eb$$

where Vrgs is the voltage in the secondary winding of the second transformer, Nrgs and Nrgp are the number of turns in the secondary and primary, respectively, of the second transformer; Itp, Lsgp and ωrg are the current, inductance and frequency, respectively, in the primary winding of the second transformer; and Tr and Eb are the retrace interval and a supply voltage, respectively.

16. A high voltage generation circuit incorporated into a horizontal circuit of a cathode ray tube monitor for supplying an anode electrode voltage to the cathode ray tube, comprising:

a horizontal output transistor having a drain;

a retrace capacitor connected in parallel with said horizontal output transistor;

damping diode means connected to said horizontal output transistor for clamping a minimum voltage at the drain to approximately ground potential;

a first transformer having primary and secondary windings, wherein the primary winding is coupled between a DC power supply and the drain of the horizontal output transistor;

a second transformer having a primary winding and a secondary winding, said primary winding being coupled between the retrace capacitor and ground for producing a voltage at the secondary winding of said second transformer each time a free oscillation occurs between a damping interval of the damping diode means and a conduction interval of the horizontal output transistor; and diode means connected to the secondary winding of the second transformer for rectifying the voltage produced at the secondary winding of the second transformer, thereby returning energy stored in the retrace capacitor to the power supply as a return current.

17. The high voltage generation circuit as claimed in claim 16, further comprising error detector means connected to the secondary winding of the first transformer for comparing a DC voltage detected at the secondary winding of the first transformer with a reference voltage to produce an error detect signal.

18. The high voltage generation circuit as claimed in claim 17, further comprising pulse width modulator means connected to said error detector means and responsive to the error detect signal for supplying a pulse-width modulated signal to the base of the horizontal output transistor, whereby a switching operation is performed by the horizontal output transistor.

19. The high voltage generation circuit as claimed in claim 16, wherein the first transformer is a flyback transformer, and wherein, by setting a given turns ratio between the primary and secondary windings of the first transformer, a high voltage is generated in the secondary winding of the first transformer, said circuit further comprising additional diode means connected to the secondary winding of the first transformer for producing an anode voltage for the cathode ray tube.

20. The high voltage generation circuit as claimed in claim 16, wherein the second transformer has a predetermined turns ratio between the primary and secondary windings thereof such that the voltage at the secondary winding is set to a given value that allows the diode means to be in a cut-off region at discharge of the retrace capacitor if the retrace capacitor is charged to a value more than one-half of a value of a supply voltage.

21. The high voltage generation circuit as claimed in claim 20, wherein the turns ratio between the primary and secondary windings of the second transformer satisfies the following expression:

$$\left(\frac{Nrgs}{Nrgp}\right) > 2$$

where Nrgp and Nrgs represent the number of turns in the primary winding and the secondary winding, respectively, of the second transformer.

22. The high voltage generation circuit as claimed in claim 16, wherein the voltage at the primary winding of the second transformer satisfies the following expression in order to cut off the diode means during the retrace interval:

$$Vrgp = -\left(\frac{d}{dt}\right) Itp \cos(\omega rg \times t) \times Lsgp$$

where Vrgp is the voltage, Itp is the current, ωrg is the frequency, and Lsgp is the inductance in the primary winding of the second transformer.

23. The high voltage generation circuit as claimed in claim 16, wherein the voltage at the secondary winding of the second transformer satisfies the following expression:

$$Vrgs = \left(\frac{Nrgs}{Nrgp}\right) Itp Lsgp \left(\frac{\pi}{Tr}\right) \sin(\omega rg \times t) < Eb$$

where Vrgs is the voltage in the secondary winding of the second transformer, Nrgs and Nrgp are the number of turns in the secondary and primary, respectively, of the second transformer; Itp, Lsgp and ωrg are the current, inductance and frequency, respectively, in the primary winding of the second transformer; and Tr and Eb are the retrace interval and a value of a supply voltage, respectively.

* * * * *